(12) United States Patent
Tanida

(10) Patent No.: US 6,170,522 B1
(45) Date of Patent: Jan. 9, 2001

(54) SELF-SEAL TYPE DOUBLE-PIPE JOINT

(75) Inventor: Kouichi Tanida, Kyoto (JP)

(73) Assignee: Kyoseki Sangyo Co., LTD, Kyoto (JP)

( * ) Notice: Under 35 U.S.C. 154(b), the term of this patent shall be extended for 0 days.

(21) Appl. No.: 09/355,013

(22) PCT Filed: Jan. 22, 1998

(86) PCT No.: PCT/JP98/00284

§ 371 Date: Jul. 22, 1999

§ 102(e) Date: Jul. 22, 1999

(87) PCT Pub. No.: WO98/33002

PCT Pub. Date: Jul. 30, 1998

(30) Foreign Application Priority Data

Jan. 23, 1997 (JP) .................................................. 9-046890
Oct. 20, 1997 (JP) .................................................. 9-325109

(51) Int. Cl.⁷ ...................................................... F16L 29/00

(52) U.S. Cl. ................................. 137/614.02; 137/614.04

(58) Field of Search ......................... 137/614.02, 614.03, 137/614.04, 614

(56) References Cited

U.S. PATENT DOCUMENTS 5,014,743 * 5/1991 Makishima ...................... 137/614.03

* cited by examiner

*Primary Examiner*—Kevin Lee
(74) *Attorney, Agent, or Firm*—Armstrong, Westerman, Hattori, McLeland & Naughton

(57) ABSTRACT

An improved self-sealing-type double tube joint which has a pair of tubular outer shell 11, 21, each of which having a tubular inner barrier wall 12, 22 fixed therein so as to form a double flow passage. The tubular barrier wall 22 in a male outer shell 21 is closed at front end 23 therof, and a side passage 24 connecting to the flow passage 1 is formed in a side wall of the tubular barrier wall. A male-side ring-like movable valve element 41 is slidably mounted on the tubular inner barrier wall 22 so that the valve element 41 shuts the side passage and faces against an end surface of a tubular barrier wall 12 of the female outer shell 11. A female-side ring-like movable valve element 51 is mounted on the inner tubular barrier wall 12 in the female outer shell 11 so as to face against an end surface of the male tubular outer shell 21. A female-side center movable valve element 31 has a side wall through which a side passage 32 is opened to connect with the inner flow passage 1, and the center valve element 31 is inserted in a front area of the female-seide barrier wall 12.

8 Claims, 16 Drawing Sheets

SELF-SEAL TYPE DOUBLE-PIPE JOINT

FIELD OF THE INVENTION

The present invention relates to a self-sealing-type double tube joint having a pair of tubular outer shells, each of which has a tubular inner barrier wall fixed therein so as to form a double flow passage, i.e. an inner flow passage and an outer flow passage, and a movable valve element inserted between the barrier wall and the outer shell and/or inserted in the barrier wall with interposing a sealing member so as to be urged forward by a spring device. The inner passages are connected mutually and the outer passages are connected mutually independently, by combining the pair of outer shells so that the tubular barrier walls push the movable valve elements. Such double tube joint is used for high or low pressure pipes for refrigerant cycle of a separate-type air-conditioner, oil pipes for hydraulic circuit, fuel feeding pipes, and the like.

BACKGROUND OF THE RELATED ART

Such types of double tube joints are disclosed in Jikkai Sho-51 No. 161619 (Unexamined Japanese utility model publication No. 161619/1976) and Jikkai Hei-5 No. 30687 (Unexamined Japanese utility model publication No. 30687/1994).

In those known joints, the outer flow passages are connected mutually by jointing a male outer shell to the female outer shell so as to push movable valve elements arranged on tubular barrier walls backward. Further, the inner flow passages are connected mutually by abutting valve rods which are urged forward in the tubular barrier walls so as to push mutually rearward. Therefore, at a step when the male and female outer shells are connected mutually, though the movable valve element in the outer passage side becomes in contact with the outer shell, the valve rods should be in a state where the rods do not yet push mutually, since a space for enabling the valve rods to be projected is required at the abutting portion. In the state where a union nut is screwed, the movable valve elements go back to connect the outer passages mutually. However, air in the space between the ends of rods in the inner passages cannot escape out. Then, the valve rods go back and the inner passages are connected through with enclosing the air in the inner passages.

Therefore, when the double tube joint is used for the above-mentioned air-conditioner, hydraulic oil pipes or fuel feeding pipes, the air is undesirably entered and mixed in the fluid in the pipes at the step that the inner passages are connected mutually. Especially, in the case of a joint used in a refrigerant cycle pipes for a separate-type air-conditioner, moisture in the air is frozen and the system becomes unserviceable.

SUMMARY OF THE INVENTION

The object of the present invention is to improve such self-sealing-type double tube joint which has a pair of tubular outer shells 11, 21, each of which has a tubular inner barrier wall 12, 22 fixed therein so as to form a double flow passage having inner flow passage 1 and outer flow passage 2, and a movable valve element 31, 41, 51 inserted between the barrier wall and the outer shell and/or inserted in the barrier wall with interposing a sealing member so as to be urged forward by a spring device. The inner passages 1 and the outer passages 2 are connected independently, by combining the pair of outer shells 11, 22 mutally so that the inner barrier walls 12, 22 push the movable valve elements 31, 41, 51.

That is to say, the object of the invention is to provide an improvement that the inner passages and outer passages are jointed at the same time without entraining outside air when the outer shells are combined mutually.

In accordance with the present invention, there is provided an improvement in a self-sealing-type double tube joint which has a pair of tubular outer shells 11, 21, each of which has a tubular inner barrier wall 12, 22 fixed therein so as to form a double flow passage having inner flow passage 1 and outer flow passage 2, and a movable valve element 31, 41, 51 inserted between the barrier wall and the outer shell and/or inserted in the barrier wall with interposing a sealing member so as to be urged forward by a spring device. The inner passages 1 and the outer passages 2 are connected independently, by combining the pair of outer shells 11, 22 mutally so that the inner barrier walls 12, 22 push the movable valve elements 31, 41, 51. The improvement is characterized that the joint is constructed such that the outside air in a contacting sealed portion flow out of the tubular barrier wall without staying, before the tubular inner barrier walls 12, 22 become in contact with the movable valve elements 31, 41, 51 so as to dam the contacting sealed portions of the inner flow passages 1 and the outer flow passages 2 from outside air. Therefore, outside air can be prevented from being entered and mixed in the inside of the outer flow passage 2 and inner flow passage 1 when the outer flow passages 2 and inner flow passages 1 are respectively connected. As a result fluid in the pipings system can be prevented from leakage to outside during joint of the double tube joint, and therefore, a piping joint capable of keeping the purelity of the fulid in the pipings can be realized.

In a preferable joint of the present invention, front ends of the tubular inner barrier walls 12, 22 and front ends of the movable valve elements 31, 41, 51 construct abutting surfaces in the pair of outer shells 11, 21, and the abutting surfaces are closely contacted before combine of the pair of outer shells 11, 21 are progressed to connect the inner flow passages 1 mutually and to connect the outer flow passages 2 mutually. Therefore, the outside air which tend to stay in the outer shells 11, 21 can be compulsorily discharged out of the outer shells 11, 21, and the outside air can be securely prevented from being mixed in the inner flow passage 1 and the outer flow passage 2.

In another preferable joint of the invention, the pair of outer shells 11, 21 are a female outer shell 11 and a male outer shell 21, and a front end surface of the male outer shell 21 is placed on a plane on which a front end surface of the tubular inner barrier wall 22 and a front end surface of the movable valve element 41 are placed. Therefore, construction is simple, portions to be sealed is reduced, and low cost and advantage of reliance of air-tightness can be realized.

In further another joint of the invention, the pair of outer shells 11, 21 are a female outer shell 11 and a male outer shell 21, the male outer tubular shell 21 has a tubular barrier wall 22 having a closed front end 23, an opening of a side passage 24 is formed in a side wall of the tubular barrier wall 22 in the male outer shell 21, a tubular or ring-like movable valve element 41 is mounted on the tubular inner barrier wall 22 so that the valve element 41 shuts the side passage 24 and faces against a front end surface of a tubular barrier wall 12 of the female outer shell 11, a gap portion 42 is formed between a rear outer face of the movable valve element 41 and an inner surface of the male outer shell 21 to connect with an outer flow passage 2, another tubular or ring-like movable valve element 51 is mounted on an inner tubular barrier wall 12 in the female outer shell 11 so as to face against an end surface of the male tubular outer shell 21, another gap 13 is formed between the tubular inner barrier wall 12 and the movable valve element 51 to connect with the outer tubular passage 2, a center valve element 31 is inserted in a front area of the tubular barrier wall 12 so as to face against a front end of the tubular barrier wall 22 in the male outer shell 21, and the center movable valve element 31 has a side wall through which a side passage 32 is opened to connect with the inner flow passage 1, and the center movable valve element 31 has an enlarged portion 33 at a portion rear of the side passage 32, whereby the inner flow passage 1 and the outer flow passage 2 being constructed. Therefore, when the double tube joint is jointed and connected through or separated, the fluid can be securely prevented from leakage.

In the preferable joint of the present invention, by sealing a contacting portion between the male outer shell 21 and the female outer shell 11 with a metal sealing member, the contacting portion can be prevented from degradation due to the fluid to be sealed.

In the preferable joint of the present invention, by sealing a contacting portion between the male outer shell 21 and the female outer shell 11 with conical angle contact, the fulid is further prevented from leaking in a state that the double tube joint is connected.

In the preferable joint of the present invention, the movable valve element 41 has a movable wall 61 facing against the front end of the tubular barrier wall 12 and a valve wall 62 mounted on the movable wall 61, and the valve wall 62 is urged forward and engageable with the movable wall 61 so that the valve wall 62 is pushed back when the movable wall 61 goes back. Therefore, the sealing portions are not exposed to the surface of fluid flow, and therefore, the durability of the sealing portion is increased.

DETAILED DESCRIPTION OF THE PREFERRED EMBODIMENT

Figure 1:
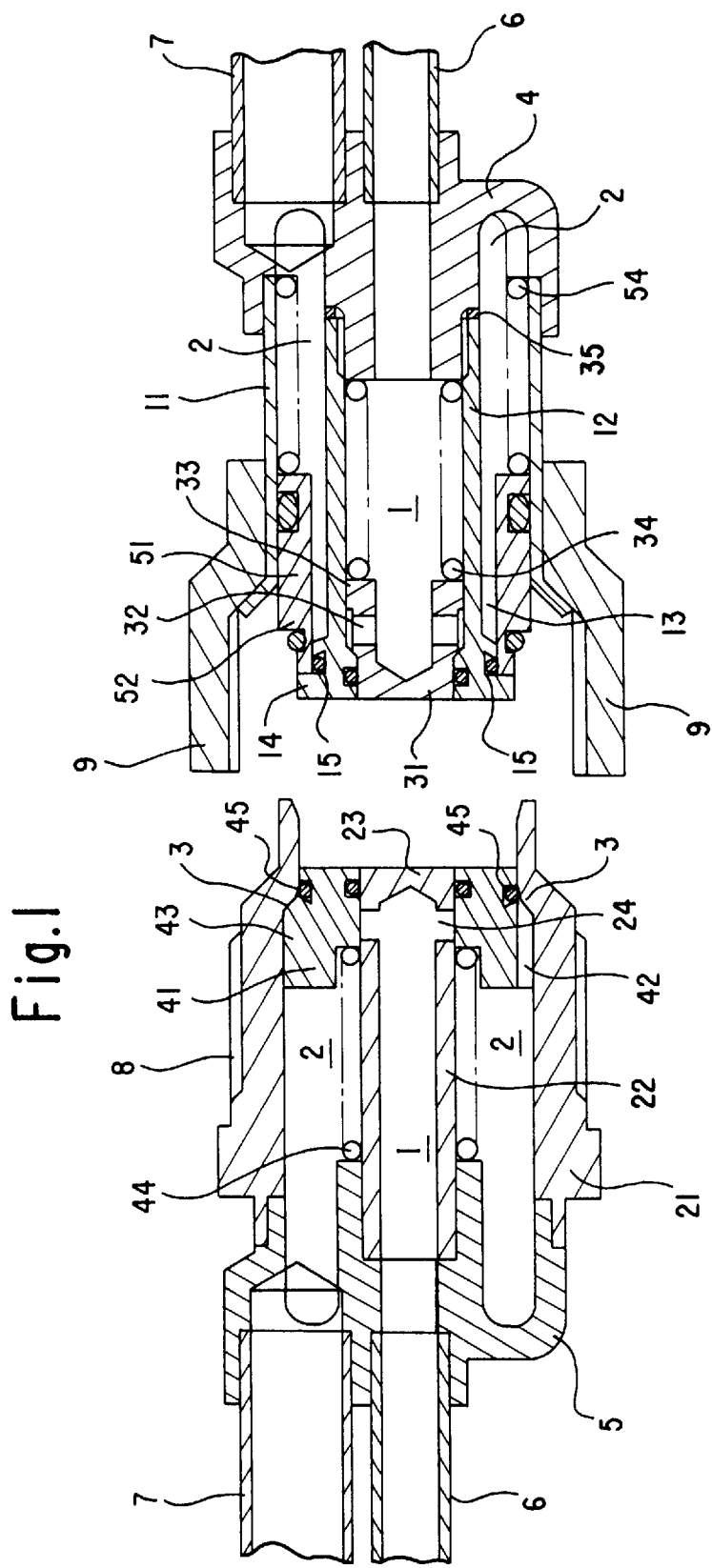
FIG. 1 is a longitudinal sectional view in separated state showing an embodiment of the joint of the present invention.

Hereinafter, referring the attached drawings, embodiments of the present invention will be explained. The attached drawings relate to joints to be used for a refrigerant cycle pipes of separate-type air-conditioner.

Referring to a joint shown in FIGS. 1, 2 and 3, connection of a pair of tubular outer shells is explained hereinafter.

As to an inner flow passage 1, a front end 23 of a tubular barrier wall 22 in a male outer shell 21 is closed, and a side wall of the barrier wall 22 is provided with an opening of a side passage 24 so as to be connected to the inner flow passage 1. However, the passage 24 is ordinarily covered with a tubular or ring-like movable valve element 41 so that the passage 24 is kept to be closed. The valve element 41 is slidably mounted on the tubular barrier wall 12 for sliding motion in the axial direction, and is urged toward a front end by a spring device (hereinafter, to be merely referred as spring) 44. The ring-like valve element 41 is situated with facing against a front end surface of a tubular barrier wall 12 in a female outer shell 11.

Beside, in the female outer shell 11 side, the tubular barrier wall 12 is fixed, and a cup-like center movable valve element 31 is inserted in the tubular barrier wall 12 so as to be slidable in the axial direction. The center valve element 31 has a side wall provided with an opening of a side passage 32 connecting to the inner flow passage 1. The center movable valve element 31 is urged toward a front end side by a spring 34 and has a flange or annular enlarged portion 33 at the rear side of the opening of the side passage 32.

When male outer shell 21 is inserted into the female outer shell 11 so that the front end of the male-side barrier wall 22 abuts against the center movable valve element 31 (see FIG. 2), and a union nut or nut 9 is screwed forward, the barrier wall 22 in the male outer shell 21 pushes the center valve element 31 in the female outer shell 11 rearward, and the barrier wall 12 of the female outer shell 11 pushes the tubular movable valve element 41 of the male outer shell 21 rearward. As both of the barrier walls 22, 12 continuing to go forward further, the center valve element 31 goes back also. Then, a gap corresponding to an enlarged portion 33 of the center valve element 31 is formed at an area between the inner surface of the barrier wall 12 of the female outer shell 11 and the outer surface of the center valve element 31 since the valve element 31 has an enlarged portion 33 at the rear end thereof. Further, the gap is extended gradually to an area between the inner surface of the barrier wall 12 and the outer surface of the barrier wall 22. Therefore, when the opening of the side passage 24 in the barrier wall 22 of the male outer shell 21 reaches the gap formed at the inside area of the barrier wall 12 of the female outer shell 11, the male and female inner flow passages 1, 1 are connected mutually (see FIG. 3).

As to the outer flow passage 2, the above-mentioned ring-like valve element 41 in the male outer shell 21 has grooves or gap portions 42 extending in the axial direction at rear outer surface so as to form a passage between the outer surface of the valve element 41 and the inner surface of the outer shell 21 for connecting to the outer flow passage 2. When the movable valve element 41 is advanced, the valve element 41 functions not only as an element to close the inner flow passage 1, but also as an element to close the outer flow passage 2 at the same time.

A ring-like movable valve element 51 is arranged at the out side of the barrier wall 12 in the female outer shell 11 and is urged toward the free end by a spring 54. The ring-like valve element 51 is inserted in the inside of the female outer shell 11 so as to be slidable in the axial direction, and is faced against the free end of the male outer shell 21. Since the barrier wall 12 is thinned excepting the free end portion, a gap 13 is formed between the outer face of the movable valve element 51. The gap 13 is connected to the outer flow passage 2. Therefore, when the ring-like movable valve element 51 advanced, the outer flow passage 2 is kept to be closed.

When the male outer shell 21 is inserted into the female outer shell 11 so that the barrier walls 12, 22 abut against the movable valve elements 31, 41 respectively, and the union nut 9 is turned to go forward, the barrier wall 12 in the female outer shell 11 pushes the ring-like movable valve element 41 of the male outer shell 21 back, and the ring-like valve element 51 in the female outer shell 11 is pushed by the end of the male outer shell 21. As both of the barrier walls going forward continuously, the male and female outer flow passages 2, 2 are connected mutually when the front end portion of the barrier wall 12 of the female outer shell 11 passes an outer passage 2 formed between the inner face of a reduced end portion of the male outer shell 21 and the outer face of the male-side barrier wall 22 or the movable valve element 41 (see FIG. 3).

At such time that the male and female outer shells 11, 21 are abutted mutually, that is to say, just before the nut 9 is turned to go forward, the end abutting faces of the barrier walls 12, 22 and the movable valve elements 31, 41 are closely contacted mutually. Therefore, there is no gap between the abutting faces. Further, with respect to contacting faces among the male and female outer shells, the ring-like valve elements, barrier walls and center movable valve element, the mutually contacting faces are sealed. Therefore, the inner flow passages and outer flow passages are fully intercepted mutually, and those passages are fully closed from the outside of the outer shells 11, 21.

Therefore, by connecting the male outer shell 21 to the female outer shell 11, the outer and inner flow passages of the male outer shell 21 can be jointed to the outer and inner flow passages of the female outer shell 11, respectively, at the same time without admitting air.

In the above-mentioned embodiment, the barrier walls 12 and 22 in the female and male outer shells 11, 21 are supported at the rear end thereof by connecting bodies (connecting branch pipes) 4 and 5 respectively which are fixed to the rear ends of respective outer shells 11, 21. The inner flow passage 1 and the outer flow passage 2 are connected to a high pressure pipe 6 and a low pressure pipe 7 through the connecting bodies 4, 5, respectively. In stead of the connecting bodies 4, 5 shown in FIG. 1, another connecting means like a cap member which is disclosed in Jikkai Hei 5-30687 mentioned at the beginning of this specification, and the like can be employed. In order to sufficiently separate the high pressure pipe 6 from the low pressure pipe 7 so as to interpose a heat insulating material, the high pressure passage should be biased radially to a peripheral side of the connecting body 4, 5.

Beside, each barrier wall 12, 22 can be supported in the outer shell by means of another supporting member without using the connecting body 4, 5.

A rubber O-ring, for example, can be suitably used as a seal member for sealing between the outer shells and the ring-like movable valve elements and the barrier walls. However, in accordance with assembly process or the like of the joint, seal members made of another material can be used. For example, when the high or low pressure pipe 6, 7 is fixed to the connecting body 4, 5 by means of brazing or the like, high temperature state is generated. In the joint of FIG. 1, a metal seal 35 is interposed between the barrier wall 12 and the connecting body 4 so that the seal 35 can resist against heat at the next brazing process.

Further, since the seals 15, 45 are exposed in the outer flow passage 2 and are exposed to pressure fluid when the male and female outer shells are connected mutually, elastic or elastomeric rings are compulsorily inserted in a groove having a narrow opening so as to prevent the rings from falling down.

Figure 4:
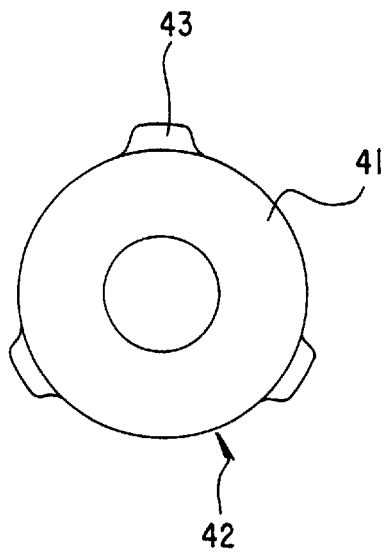
FIG. 4 is a right handed side view showing the movable valve element in the male outer shell in FIG. 1.
Figure 12:
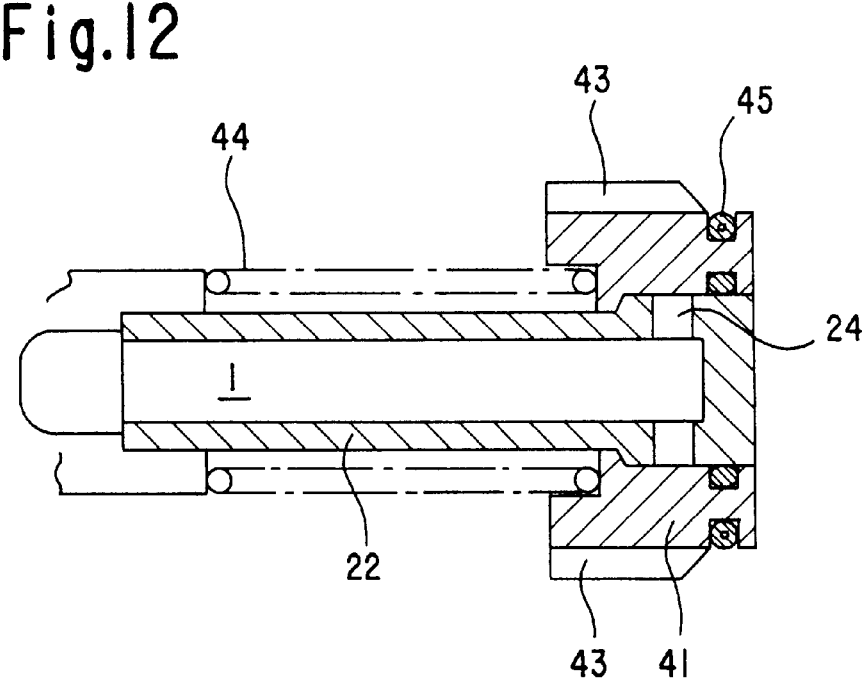
FIG. 12 is a sectional view in part corresponding to a movable valve 41 and a tubular barrier wall 22 in FIG. 1 showing another embodiment of the present invention.
Figure 13:
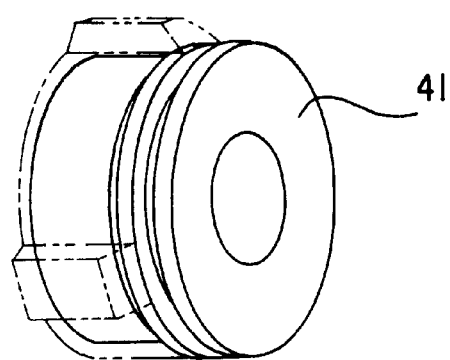
FIG. 13 is an external appearance showing another embodiment of the present invention.

In the embodiment of FIG. 1, the male-side valve element 41 urged toward the front end by a spring 44 has three projections 43 projecting radially from valve body, as shown in FIG. 4, and the projections 43 are engaged with an inwardly projecting annular step (reduced step portion) 3 of the outer shell 21. However, another construction in which an engaging step or projection is formed on the barrier wall for receiving the valve element 41 can be employed, for example (see FIG. 12). In the embodiment of FIG. 4, spaces between projections 43, 43 are utilized to provide a gap 42 between the movable valve element 41 and the inner surface of the male outer shell 21 for connecting to the outer flow passage 2. However, when the movable valve 41 is engaged with the barrier wall 22 as mentioned above, a movable valve 41 having recessed portions opening at rear portion or the like can be preferably employed for connecting to the outer flow passage 2 (see FIG. 13).

Figure 2:
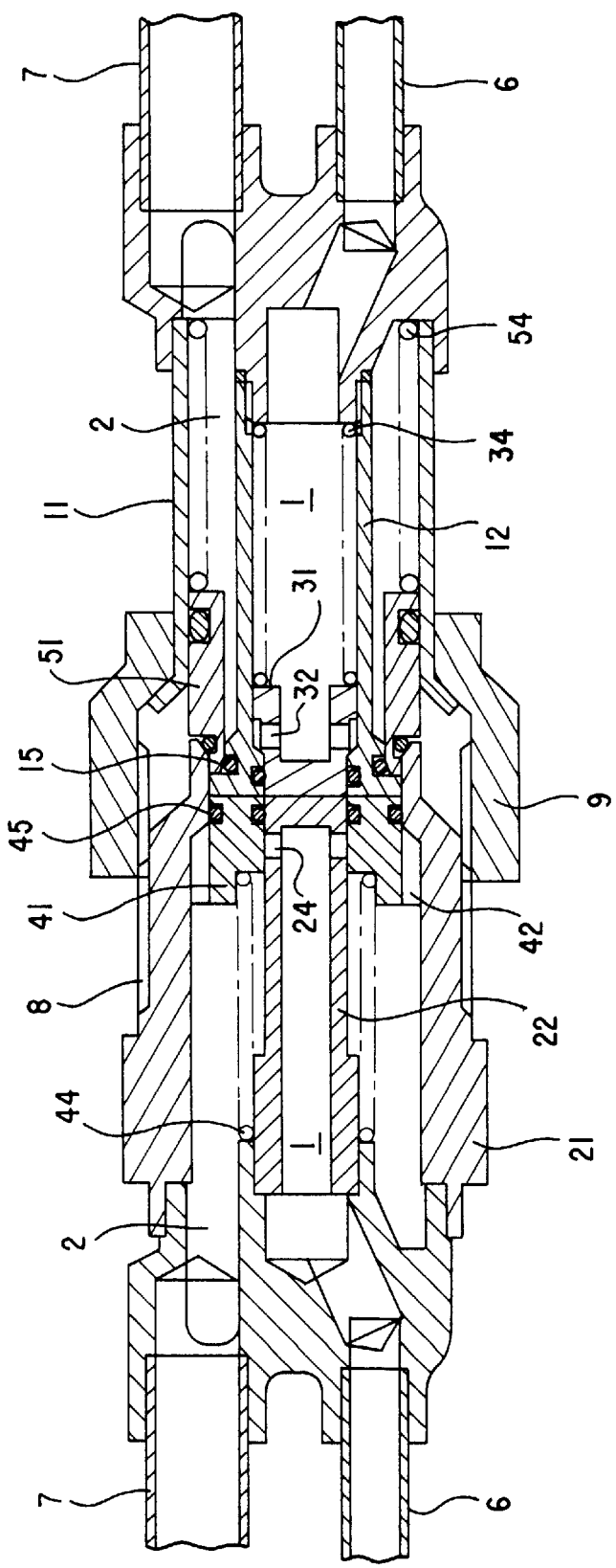
FIG. 2 is a longitudinal sectional view in the half way of jointing showing an embodiment of the joint of the present invention.
Figure 3:
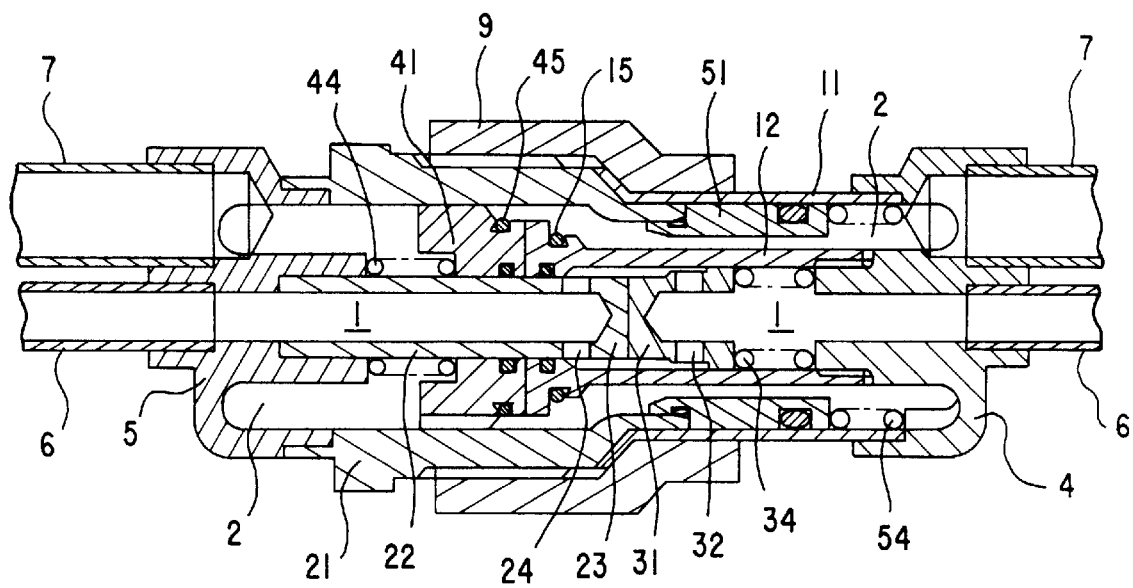
FIG. 3 is a longitudinal sectional view in jointed state showing the embodiment of the joint of FIG. 1.
Figure 14:
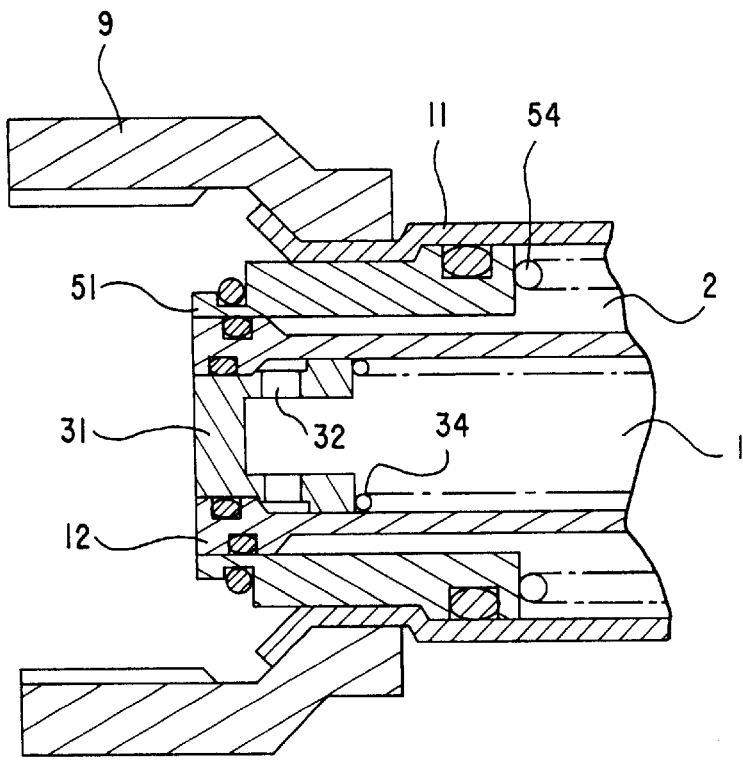
FIG. 14 is a sectional view in part corresponding to a movable valve 41 and a tubular barrier wall 22 in FIG. 1 showing further another embodiment of the present invention.

Beside, though the ring-like or cylindrical movable valve element 51 in the female outer shell 11 urged forward by a spring 54 shown in FIGS. 1 and 2 is engaged with a projecting step 14 formed at the front outer end of the barrier wall 12, another construction in which a projecting step is formed at the inner surface on the female outer shell 11 for engaging with the movable valve element 51, and the like, can be employed, for example (see FIG. 14).

As mentioned above, positions to engage with each valve element or shape of each movable valve element can be voluntarily changed in design so far as the function of the present invention is not substantially changed.

Figure 15:
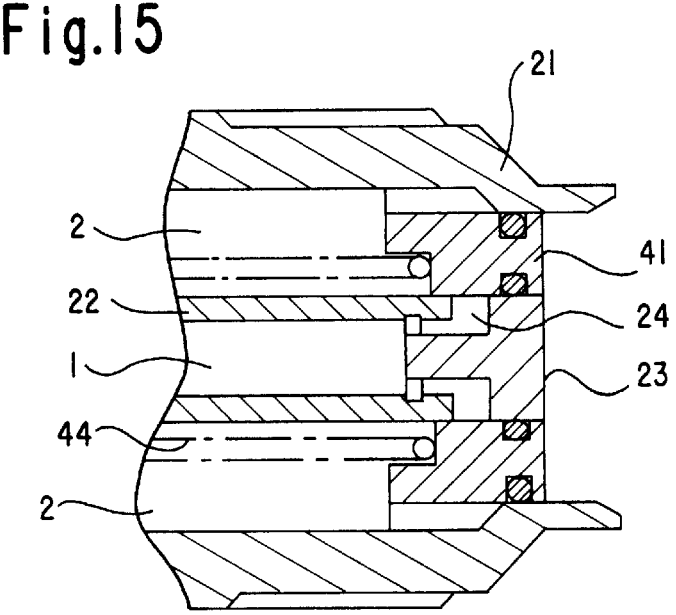
FIG. 15 is a sectional view in part corresponding to a movable valve 41 and a tubular barrier wall 22 in FIG. 1 showing further another embodiment of the present invention.

Beside, the side passages 24, 32 provided in the end portion of the barrier wall 22 and in the side wall of the center valve element 31 are shown as through holes in the drawings. However, such passages can also be opened at the side walls of the tubular barrier wall 22 or the center valve element 31, for example, by arranging a disk having the same diameter as the tubular member with remaining some distance and by supporting the disk to the end of the tubular member through supporting bars or pieces (see FIG. 15).

In the embodiment of the joint in FIG. 1, a tubular projection is extended from a reduced step portion 3 of the male outer shell 21 so that the free end of projection can abut against a step 52 formed on the outer face of a movable valve element 51 in the female outer shell 11. However, such construction in which the male outer shell 21 abuts against the movable valve 51 can be changed in design to another construction shown in FIG. 5 or FIG. 6, for example.

Figure 5:
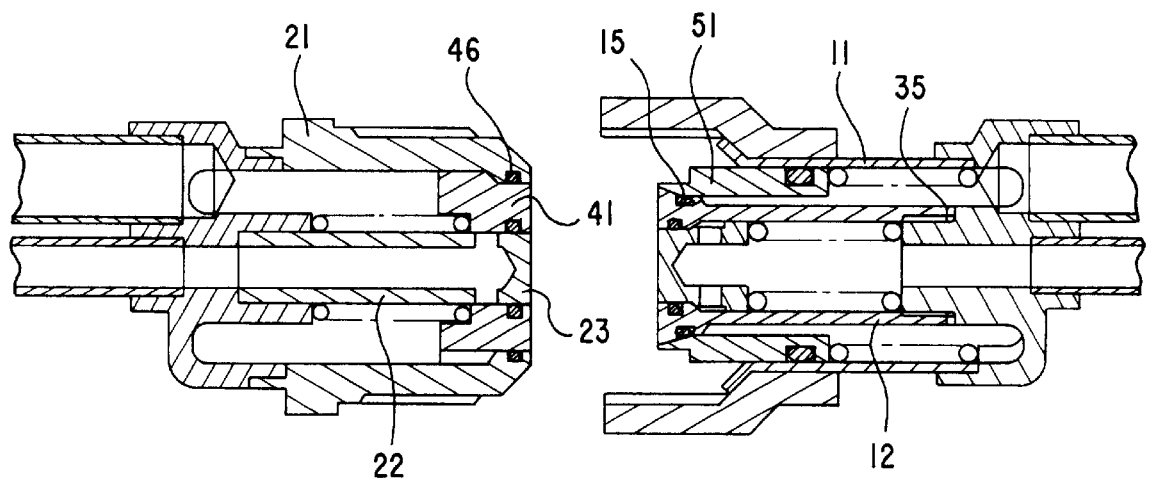
FIG. 5 is a longitudinal sectional view in separated state showing another embodiment of the joint of the present invention.

In the embodiment of FIG. 5, the free end surface of the male outer shell 21 is not projected and is on the same plane as the free end surface 23 of the barrier wall 22 and the free end surface of the movable valve 41. In the embodiment of the joint, the construction is advantageously simple, and number of positions to be sealed is reduced.

Figure 6:
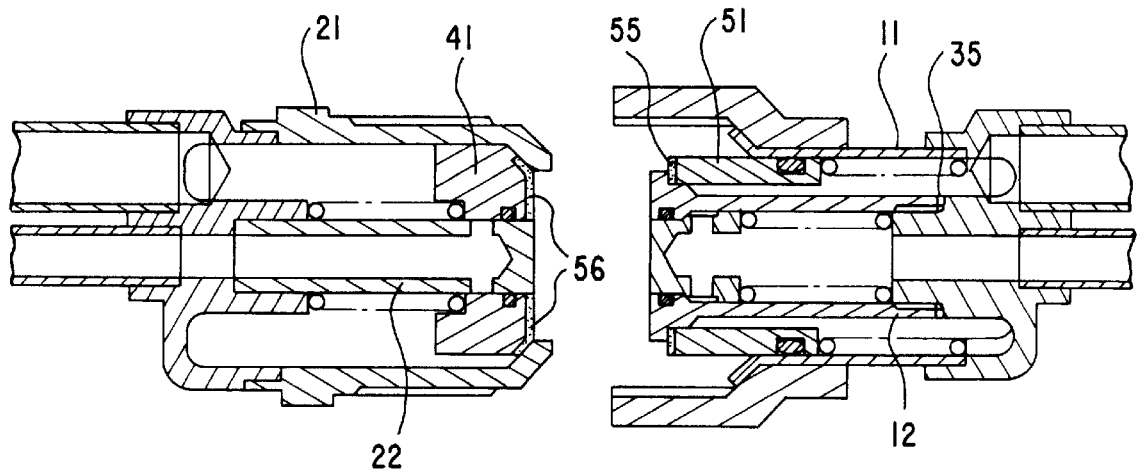
FIG. 6 is a longitudinal sectional view in separated state showing further another embodiment of the joint of the present invention.

In the embodiment of FIG. 6, the free end face of the male outer shell 21 is to be abutted against a free end face of a tubular movable valve 51. A rubber plate or sheet 55 is fixed on the front end of the movable valve 51, and a rubber plate or sheet 56 is fixed on the front end of the movable valve 41 so that respective abutting portions are sealed. Therefore, the sealing construction is further simplified, and there is no elastic or elastomeric ring exposed in the pressure fluid.

When a seal member made of elastic or elastomeric ring is exposed long time in refrigerant for air conditioner, there is a fear of degradation. In order to prevent such degradation, it is preferable to separate the movable valve into a movable wall 61 and a valve wall 62 slidably mounted on the movable wall 61 as shown in FIGS. 7 to 10. The valve wall 62 is urged forward by a spring 44b and is engaged with the movable wall 61 so that the valve wall 62 is pushed back as the movable wall going back. By employing the above-mentioned construction, the seal is not exposed in the outer flow passage.

That is to say, the movable wall 61 and the valve wall 62 are urged forward by a spring 44a and a spring 44b, respectively. The valve wall 62 is provided with projections (not shown) like the projections 43 shown in FIG. 4 at outer surface thereof. The projections are engaged with a reduced step portion of the male outer shell 21, and the movable wall 61 has an engaging portion 63 at rear portion for engaging with the rear end of the valve wall 62 so as to rest against the spring.

When the movable wall 61 is pushed by the front end of the tubular barrier wall 12, the movable wall 61 goes back. When the movable wall 61 goes back further, the movable wall 61 is engaged with the valve wall 62 to push the valve wall 62 rearward. Then an O-ring 45 fited in an annular groove at outer surface of the front end portion of the movable wall 61 is covered with the valve wall 62, and at the same time, another O-ring 15 fitted in an annular groove provided at the outer surface of the end of the tubular barrier wall 12 is also covered with the valve wall 62. Therefore, at the step when reverse mortion is completed to connect the outer flow passages mutually, both O-rings 45, 15 are not exposed.

Figure 7:
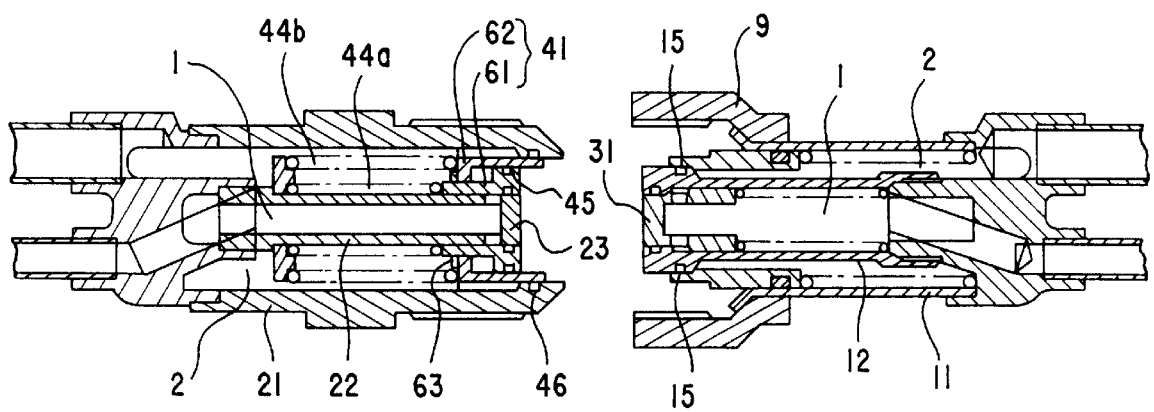
FIG. 7 is a longitudinal sectional view in separated state showing an embodiment of the joint of the present invention in which O-ring is unexposed in the flow passage when joint is connected.
Figure 8:
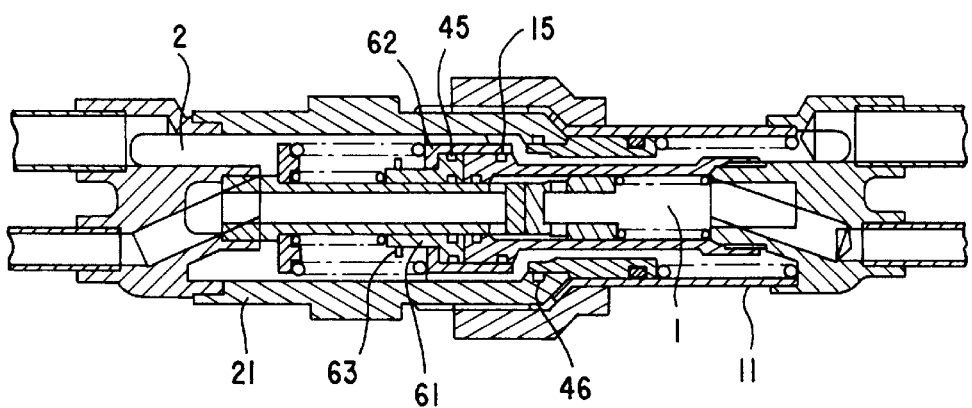
FIG. 8 is a longitudinal sectional view showing a connected state of the joint of FIG. 7.

The embodiment shown in FIGS. 7 and 8, the free end of the male outer shell 21 has the same shape as the embodiment of FIG. 5. However, the movable wall 61, the valve wall 62 and the front end portion 23 of the barrier wall are slightly sifted to the rear side of the end of the male outer shell 21. Further, the barrier wall 12 and the movable center valve element 31 in the side of the female outer shell 11 are projected outside.

Figure 9:
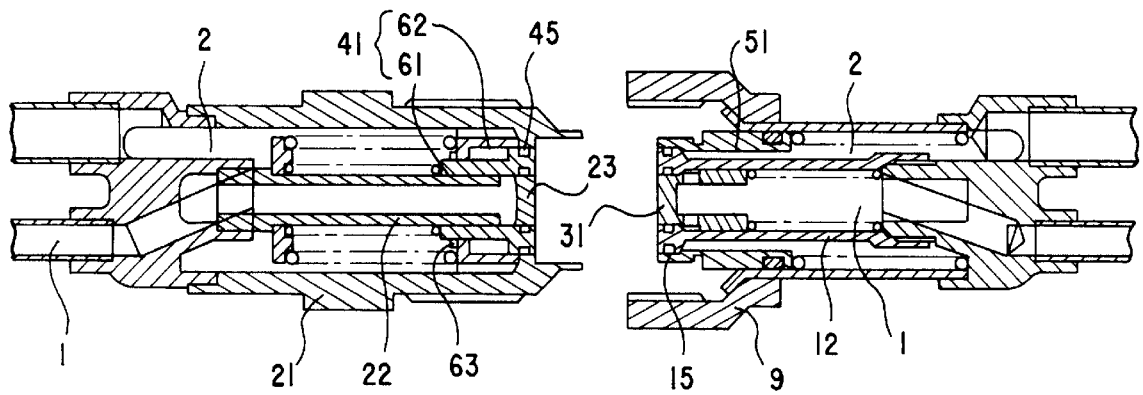
FIG. 9 is a longitudinal sectional view in separated state showing another embodiment of the joint of the present invention in which O-ring is unexposed in the flow passage when joint is connected.
Figure 10:
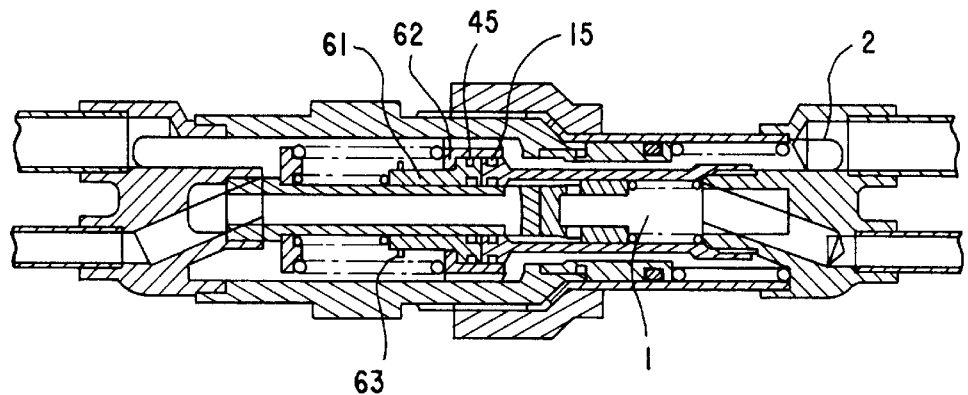
FIG. 10 is a longitudinal sectional view showing a connected state of the joint of FIG. 9.

FIGS. 9 and 10 show another embodiment in which the end of the female outer shell 21 has the same shape as the embodiment of FIG. 1.

In the joint of FIGS. 1 to 10, an outer wall of metal male outer shell and a metal female outer shell can be closely fitted mutually with cone angle fitting to obtain a direct metal sealing. Therefore, by any chance, refrigerant permeate an O-ring as a seal, the metal fitting functions as a seal for preventing refrigerant from dispercing out of the joint.

When the cone angle fitting is not employed, another metal seal ring can be employed to obtain the above-mentioned metal seal function.

If there is no possibility that the refrigerant permeate the O-ring, it is not necessary to provide any metal seal member in the contacting portions between the male and female outer shells.

The above-mentioned embodiment employs a construction that a barrier wall 22 fixed in a male outer shell 21 pushes a center valve element 31 to open/close an inner flow passage 1 in a female outer shell 11, and another barrier wall 12 fixed in the female outer shell 11 pushes a tubular movable valve element 41 to open/close an outer flow passage 2. However, the interior constructions in the female and male outer shells can be exchanged. In such case, the same function and effect can be obtained also.

Figure 16:
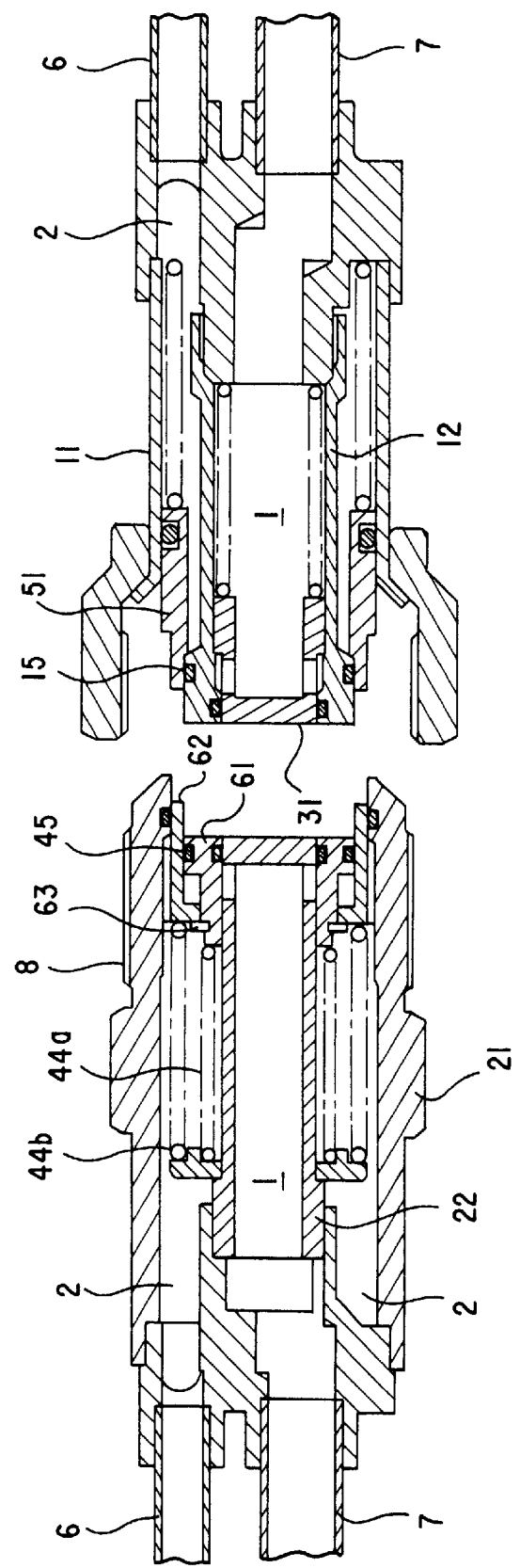
FIG. 16 is a longitudinal sectional view in separated state showing further another embodiment of the joint of the present invention.
Figure 17:
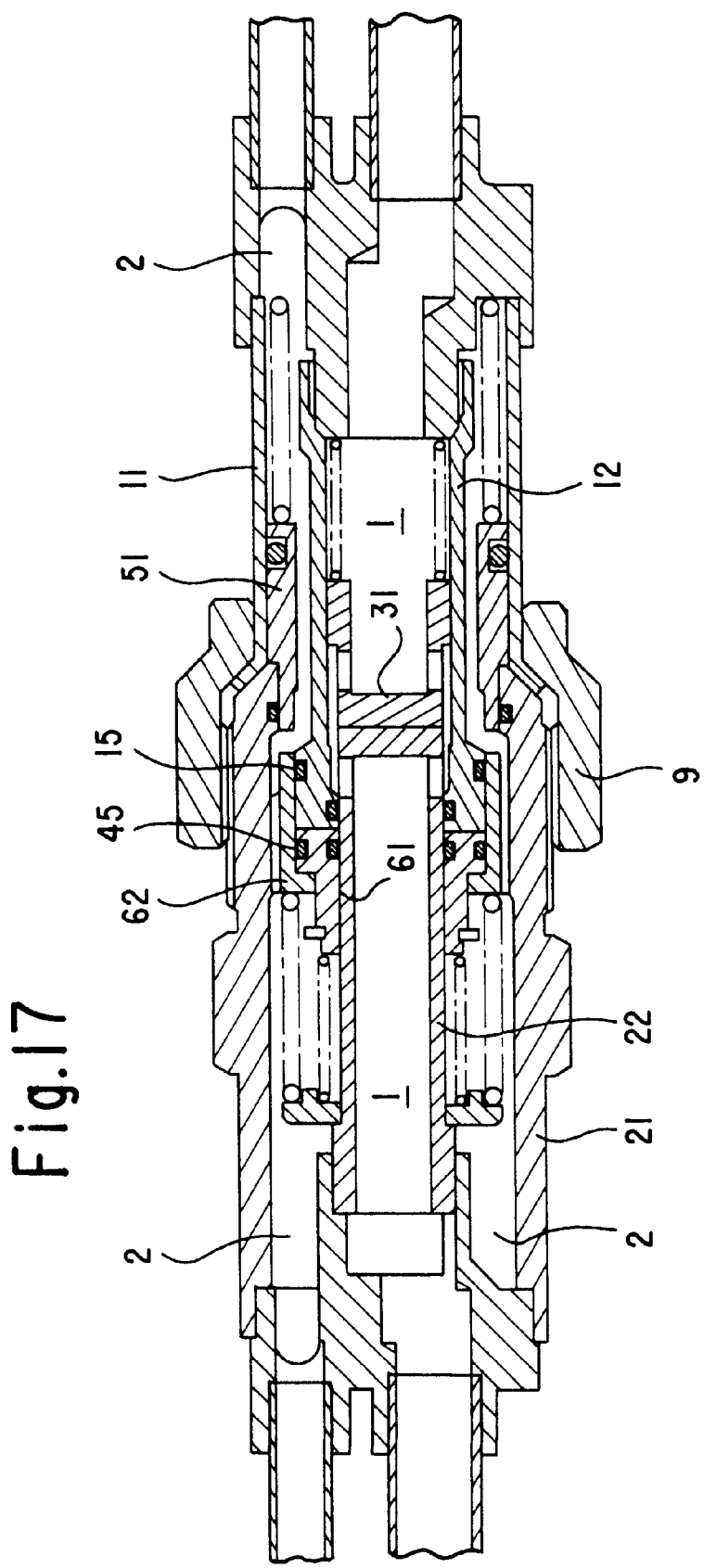
FIG. 17 is a longitudinal sectional view in jointed state showing the embodiment of the joint of FIG. 16.

In the above-mentioned embodiments, the inner flow passage 1 is connected to the high pressure pipe 6, and the outer flow passage 2 is connected to the low pressure pipe 7. However, as shown in FIGS. 16 and 17, such construction that the inner flow passage 1 is connected to the low pressure pipe 7 and the outer flow passage 2 is connected to the high pressure pipe 6 can be employed.

Figure 18:
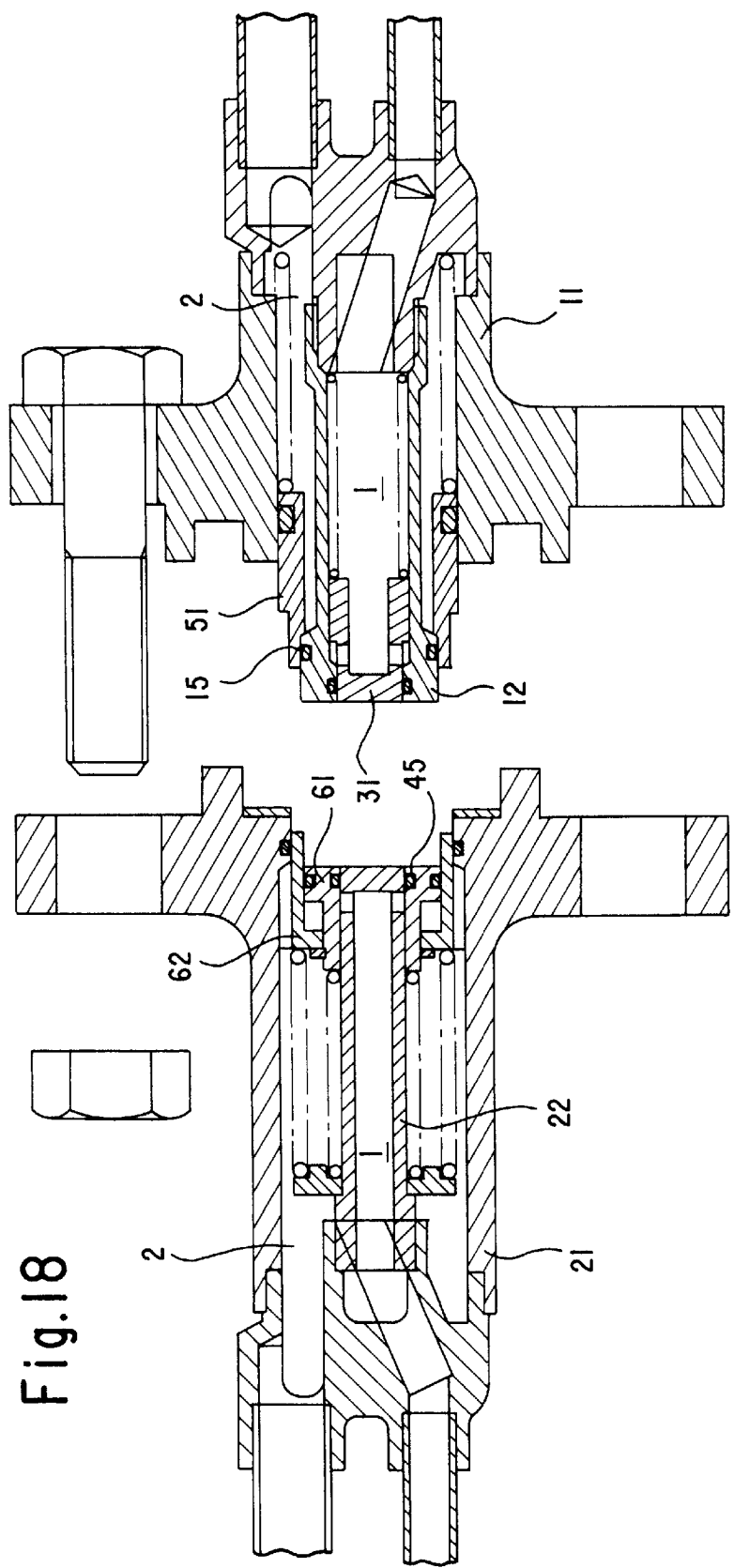
FIG. 18 is a longitudinal sectional view in separated state showing further another embodiment of the joint of the present invention.
Figure 19:
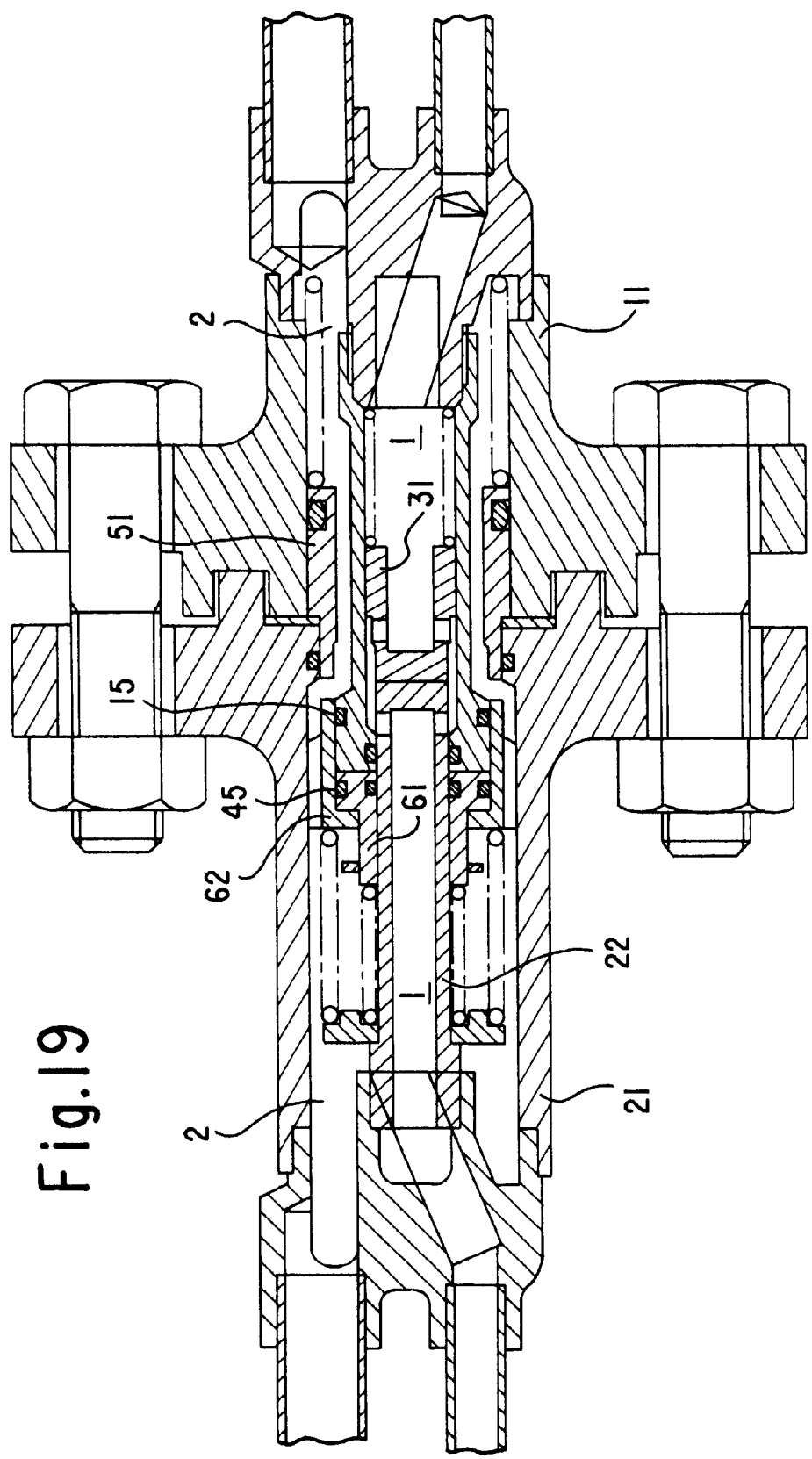
FIG. 19 is a longitudinal sectional view in jointed state showing the embodiment of the joint of FIG. 18.
Figure 20:
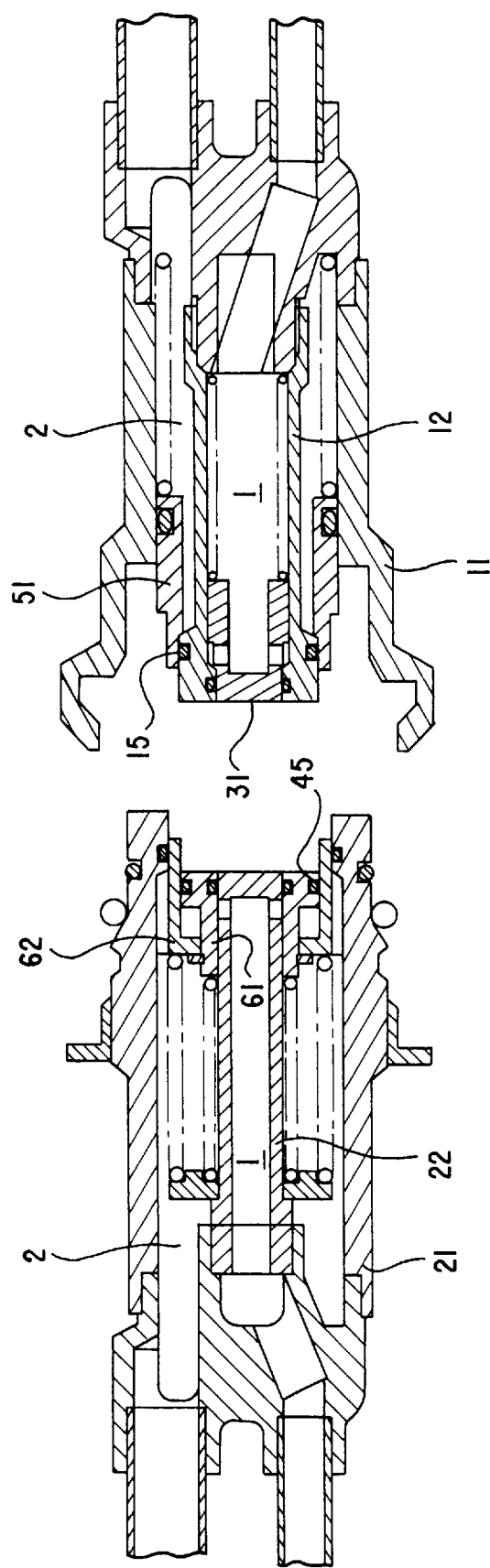
FIG. 20 is a longitudinal sectional view in separated state showing further another embodiment of the joint of the present invention.
Figure 21:
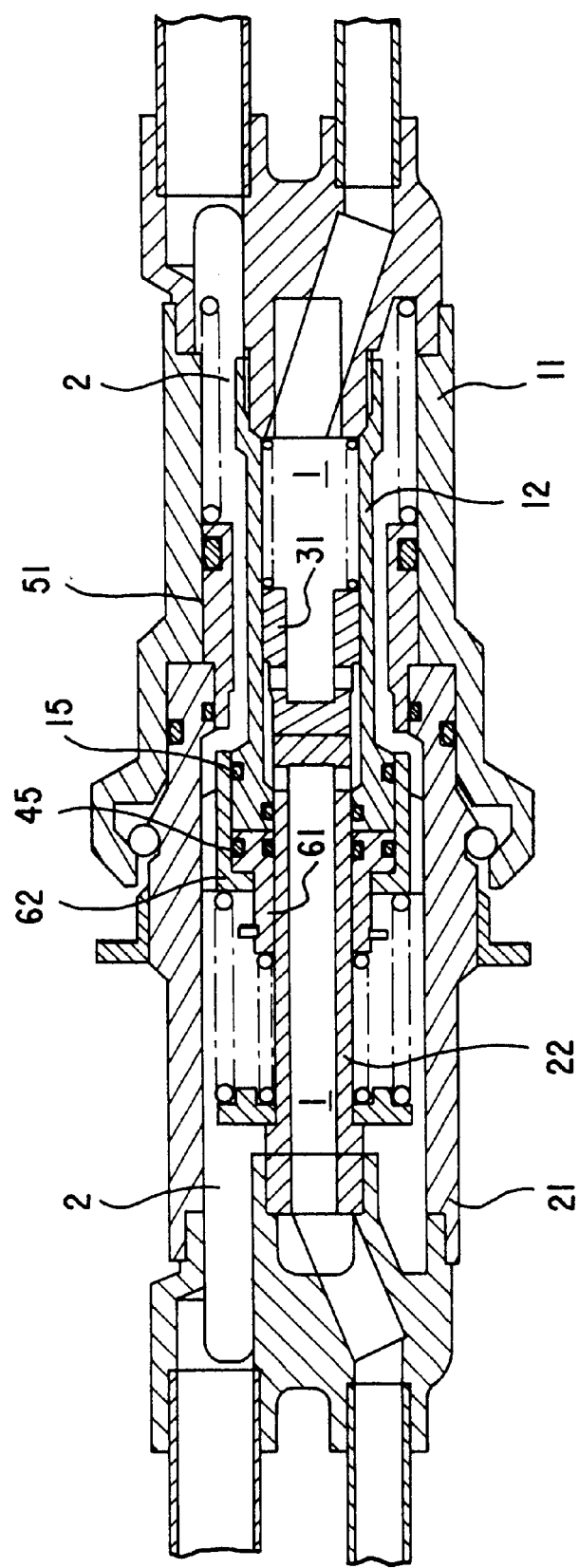
FIG. 21 is a longitudinal sectional view in jointed state showing the embodiment of the joint of FIG. 20.
Figure 22:
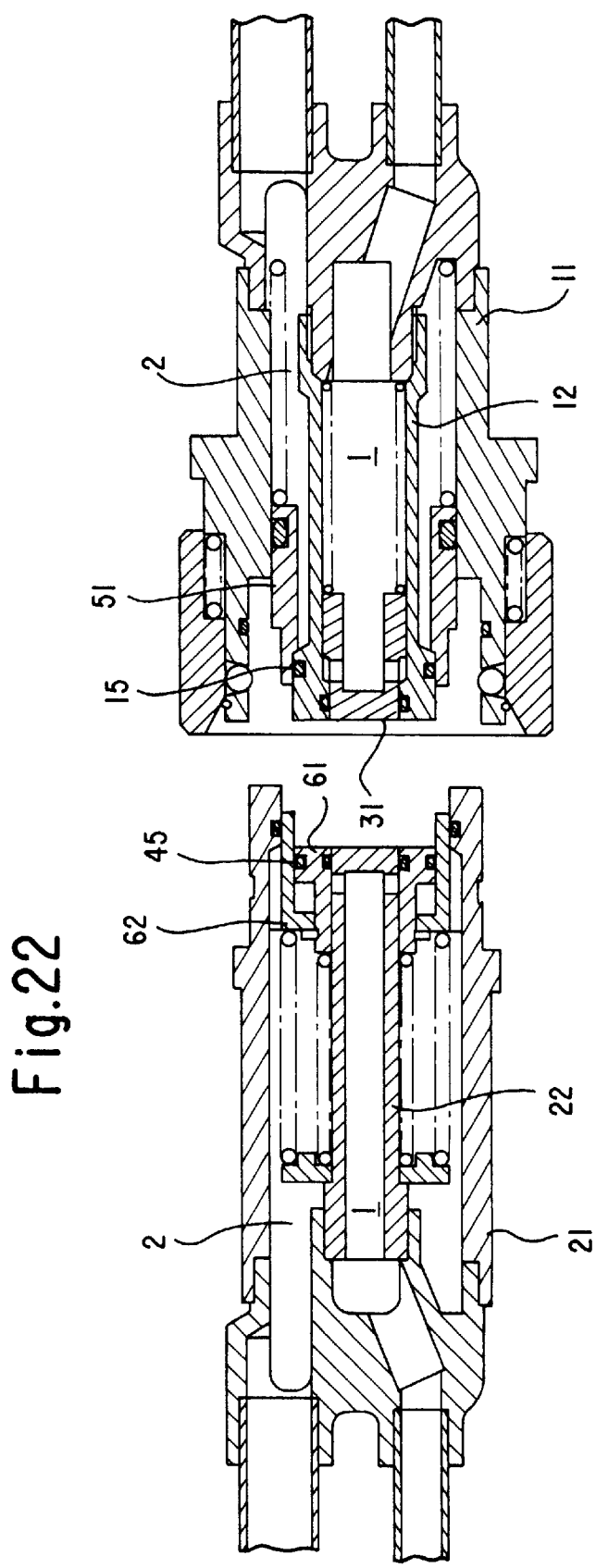
FIG. 22 is a longitudinal sectional view in separated state showing further another embodiment of the joint of the present invention.
Figure 23:
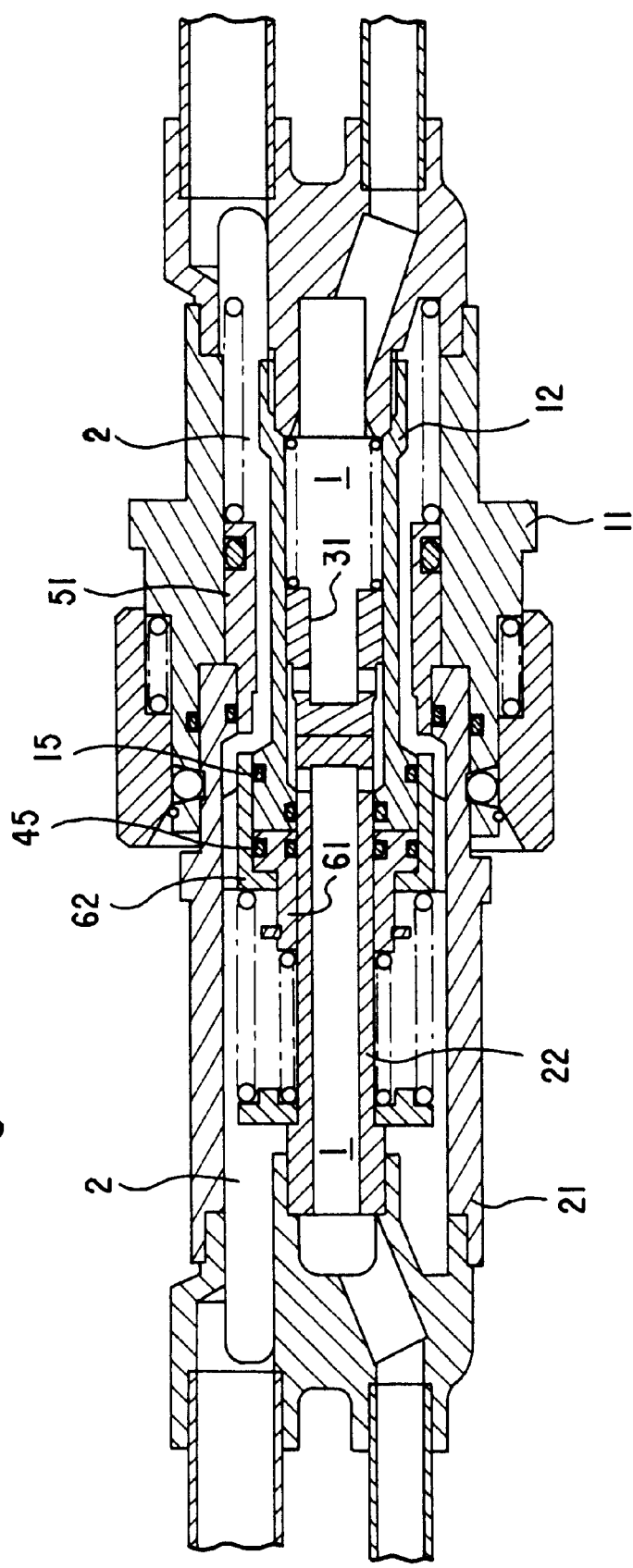
FIG. 23 is a longitudinal sectional view in jointed state showing the embodiment of the joint of FIG. 22.

Further, in the above-mentioned embodiment, the nut mounted on the outside of the female outer shell 11 is screwed on the thread surface 8 formed on the male outer shell 21. However, in accordance with use of the joint, various types of combination of outer shells, such as a female-and-male flange combination type shown in FIGS. 18 and 19, a female-and-male one-touch-coupling type which is easily attachable/detachable shown in FIGS. 20 and 21, and a female-and-male one-touch coupling type shown in FIGS. 22 and 23, can be used to joint the double tube joint.

Further, though in the above-embodiments, the high pressure pipe 6 and the low pressure pipe 7 are arranged in parallel, another arrangement in which one of the pipes is arranged so as to surround another pipe can be employed, for example, as disclosed in the above-mentioned Jikkai-sho 51-161619.

In the joint corresponding to the present invention, one of female outer shell or male outer shell can be fixed to a main body, for example, an interior arrangement 71 or an exterior arrangement 72 of a separate-type air-conditioner, and further, it can be situated between the interior and exterior arrangements in order to connect the both sides of pipes mutually.

Figure 11:
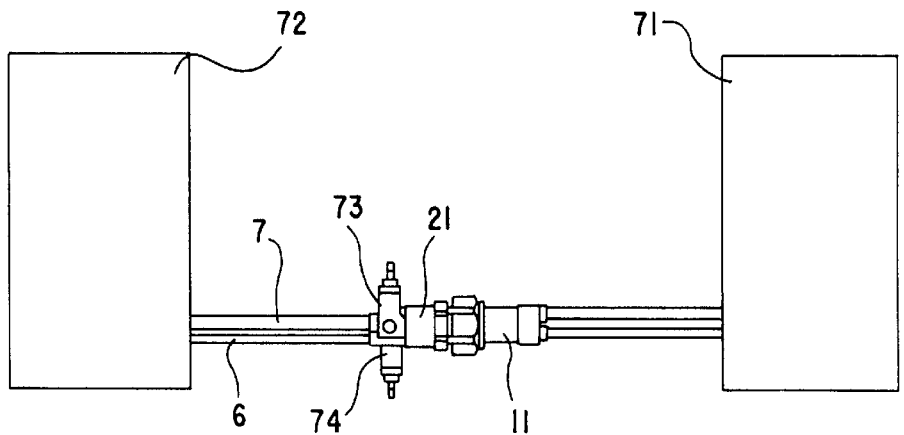
FIG. 11 is a schematic front view of a separate-type of air-conditioner to which the joint is applied.

FIG. 11 shows the latter case. In the embodiment of FIG. 11, a three way valve 73 is attached to a low pressure pipe 7, and a two way valve 74 is attached to a high pressure pipe 6, at the rear end of the male outer shell 21. Therefore, refrigerant gas can be easily supplied or supplemented when trouble arises, for example, and the gas can be easily collected and enclosed in the exterior arrangement-side.

What we claim is:

1. An improvement in a self-sealing-type double tube joint having a pair of tubular outer shells;

each of the outer shells having a tubular inner barrier wall fixed therein so as to form a double flow passage having an inner flow passage and an outer flow passage; and a movable valve element inserted between the barrier wall and the outer shell with interposing a sealing member so as to be urged forward by a spring device;

the inner flow passages and outer flow passages being able to be connected independently by combining the pair of outer shells mutually so that the inner barrier walls push the movable valve elements; and the inner flow passages and outer flow passages being able to be sealed from outside air by separating the pair of outer shells;

said improvement is characterized that:

the joint is constructed such that the outside air in a contacting sealed portion flows out of the tubular barrier wall, before the tubular inner barrier walls contact the movable valve elements so as to dam the contacting sealed portions of the inner flow passages and the outer flow passages from outside air.

2. The self-sealing-type double tube joint of claim 1, wherein:

front ends of the tubular inner barrier walls and front ends of the movable valve elements create abutting surfaces in the outer shells; and the abutting surfaces are contacted before the pair of outer shells are progressed to connect the inner flow passages mutually and to connect the outer flow passages mutually.

3. The self-sealing-type double tube joint of claim 2, wherein:

said pair of outer shells are a male outer shell and a female outer shell; and a front end surface of the male outer shell is placed on a plane on which a front end surface of the tubular inner barrier wall and a front end surface of the movable valve element are placed.

4. The self-sealing-type double tube joint of any one of claims 1 to 3, wherein:

said pair of outer shells are a male outer shell and a female outer shell;

the male outer tubular shell has a tubular barrier wall having a closed front end;

a side passage is formed in a side wall of the tubular barrier wall in the male outer shell;

a tubular or ring-like movable valve element is mounted on the tubular inner barrier wall so that the valve element shuts the side passage and faces against an end surface of a tubular barrier wall of the female outer shell;

a gap portion is formed between a rear outer face of the movable valve element and an inner surface of the male outer shell to connect with an outer passage;

a female-side ring-like movable valve element is mounted on an inner tubular barrier wall in the female outer shell so as to face against an end surface of the male tubular outer shell;

a gap is formed between the tubular inner barrier wall and the movable ring-like valve element to connect with the outer tubular passage;

a center valve element is inserted in a front area of the female-side barrier wall so as to face against a front end of the male-side barrier wall; and an center movable valve element has a side wall through which a side passage is opened to connect with the inner flow passage; and the center movable valve element has an enlarged portion at a portion rear of the side passage;

whereby the inner flow passage and the outer flow passage being constructed.

5. The self-sealing-type double tube joint of claim 4, wherein:

a contacting portion between the male outer shell and the female outer shell is sealed with a metal sealing member.

6. The self-sealing-type double tube joint of claim 4, wherein:

said male outer shell and female outer shell are capable of being sealed with conical angle contact.

7. The self-sealing-type double tube joint of claim 4, wherein:

a male-side movable valve element has a movable wall facing against the front end of the female-side tubular barrier wall and a valve wall mounted on the movable wall; said valve wall being urged forward and engageable with the movable wall so that the valve wall is pushed back when the movable wall goes back.

8. An improvement in a self-sealing-type double tube joint having a pair of tubular outer shells;

each of the outer shells having a tubular inner barrier wall fixed therein so as to form a double flow passage having an inner flow passage and an outer flow passage; and a movable valve element inserted in the barrier wall with interposing a sealing member so as to be urged forward by a spring device;

the inner flow passages and outer flow passages being able to be connected independently by combining the pair of outer shells mutually so that the inner barrier walls push the movable valve elements; and the inner flow passages and outer flow passages being able to be sealed from outside air by separating the pair of outer shells;

said improvement is characterized that:

the joint is constructed such that the outside air in a contacting sealed portion flows out of the tubular barrier wall before the tubular inner barrier walls contact the movable valve elements so as to dam the contacting sealed portions of the inner flow passages and the outer flow passages from outside air.

\* \* \* \* \*